United States Patent
Jaslow

(10) Patent No.: US 7,475,791 B2
(45) Date of Patent: Jan. 13, 2009

(54) TOROIDAL TANK

(76) Inventor: Lee Jaslow, 2633 N. Calvert St., Baltimore, MD (US) 21218

( * ) Notice: Subject to any disclaimer, the term of this patent is extended or adjusted under 35 U.S.C. 154(b) by 242 days.

(21) Appl. No.: 11/269,421

(22) Filed: Nov. 8, 2005

(65) Prior Publication Data
US 2006/0096980 A1    May 11, 2006

Related U.S. Application Data

(60) Provisional application No. 60/625,995, filed on Nov. 8, 2004.

(51) Int. Cl.
*B65D 90/02* (2006.01)
(52) U.S. Cl. .................... 220/566; 220/565; 220/567.1; 220/4.12
(58) Field of Classification Search ............... 220/4.12, 220/677, 565, 566, 567.1; 156/95
See application file for complete search history.

(56) References Cited

U.S. PATENT DOCUMENTS

| | | | | |
|---|---|---|---|---|
| 1,928,640 | A * | 10/1933 | Boardman | 220/566 |
| 1,954,581 | A * | 3/1934 | Dietrich | 220/567.1 |
| 2,250,250 | A * | 7/1941 | Brooks | 220/565 |
| 2,314,442 | A * | 3/1943 | Cook | 220/585 |
| 2,341,044 | A * | 2/1944 | Jackson et al. | 220/584 |
| 2,855,121 | A * | 10/1958 | Sturm | 220/566 |
| 3,121,451 | A * | 2/1964 | Schuerch | 220/566 |
| 3,412,891 | A * | 11/1968 | Klimpl et al. | 220/645 |
| 3,680,727 | A * | 8/1972 | Pearson | 220/586 |
| 3,936,381 | A | 2/1976 | Pacaud | |
| 3,943,724 | A | 3/1976 | Banzoli et al. | |
| D246,375 | S | 11/1977 | Hellqvist | |
| 4,101,106 | A * | 7/1978 | Denkinger et al. | 248/188.9 |
| 4,165,945 | A * | 8/1979 | Despois et al. | 405/55 |
| 4,237,004 | A | 12/1980 | Helke | |
| 4,475,662 | A * | 10/1984 | Mandel | 220/589 |
| 4,561,292 | A * | 12/1985 | Pugnale et al. | 73/49.2 |
| 4,568,925 | A * | 2/1986 | Butts | 340/605 |
| 4,589,643 | A * | 5/1986 | Breum | 220/4.12 |
| 4,615,452 | A * | 10/1986 | Lederer et al. | 220/566 |
| 4,717,040 | A | 1/1988 | Stanton | |
| 4,757,917 | A | 7/1988 | Gleich et al. | |

(Continued)

FOREIGN PATENT DOCUMENTS

EP    969242 A2 *    1/2000

(Continued)

*Primary Examiner*—Anthony Stashick
*Assistant Examiner*—Christopher B McKinley
(74) *Attorney, Agent, or Firm*—Ober/Kaler; Royal W. Craig

(57) ABSTRACT

An improved underground water storage tank having a joined-doughnut (multiple-torus) configuration, preferably a double torus although single, triple, quadruple and other toroidal configurations are possible. The concept entails a lateral merger of two or more toroidal tank sections in a multi-compartment double, triple, or greater-toroidal configuration with one or more cylindrical access ports traversing the tank orthogonally at the area of merger or along the perimeter. The tanks may be unitary as formed by rotational-molding or blow-molding. The laterally-joined torus sections increase the structural strength of the tank so that the need for reinforcing ribs or internal supports is substantially eliminated. The strength of the torus-configuration allows the tank to be buried below the frost line, and the elimination of molded ribs avoids trapped fluid or so that nearly all tank capacity can be utilized.

9 Claims, 5 Drawing Sheets

U.S. PATENT DOCUMENTS

| | | | | |
|---|---|---|---|---|
| 4,790,472 | A * | 12/1988 | Bunkoczy | 228/171 |
| 4,884,709 | A * | 12/1989 | McCarthy | 220/565 |
| 5,101,849 | A | 4/1992 | Richard | |
| 5,167,352 | A * | 12/1992 | Robbins | 220/62.2 |
| 5,217,140 | A * | 6/1993 | Lindahl | 220/4.06 |
| 5,220,799 | A * | 6/1993 | Lievens et al. | 62/48.2 |
| 5,564,588 | A * | 10/1996 | Reese | 220/565 |
| 6,056,137 | A * | 5/2000 | Cannan et al. | 220/4.12 |
| 6,176,386 | B1 * | 1/2001 | Beukers et al. | 220/562 |
| 6,223,929 | B1 * | 5/2001 | Gerhard | 220/581 |
| 6,227,396 | B1 * | 5/2001 | Small | 220/4.12 |
| 6,294,057 | B1 | 9/2001 | Wachinski et al. | |
| 6,328,890 | B1 | 12/2001 | Thibault | |
| 2004/0188447 | A1 * | 9/2004 | Bolzer | 220/653 |
| 2005/0205581 | A1 * | 9/2005 | McRae | 220/567.1 |

FOREIGN PATENT DOCUMENTS

| | | | |
|---|---|---|---|
| EP | 1291221 | A1 * | 3/2003 |
| EP | 1378390 | A1 * | 1/2004 |

* cited by examiner

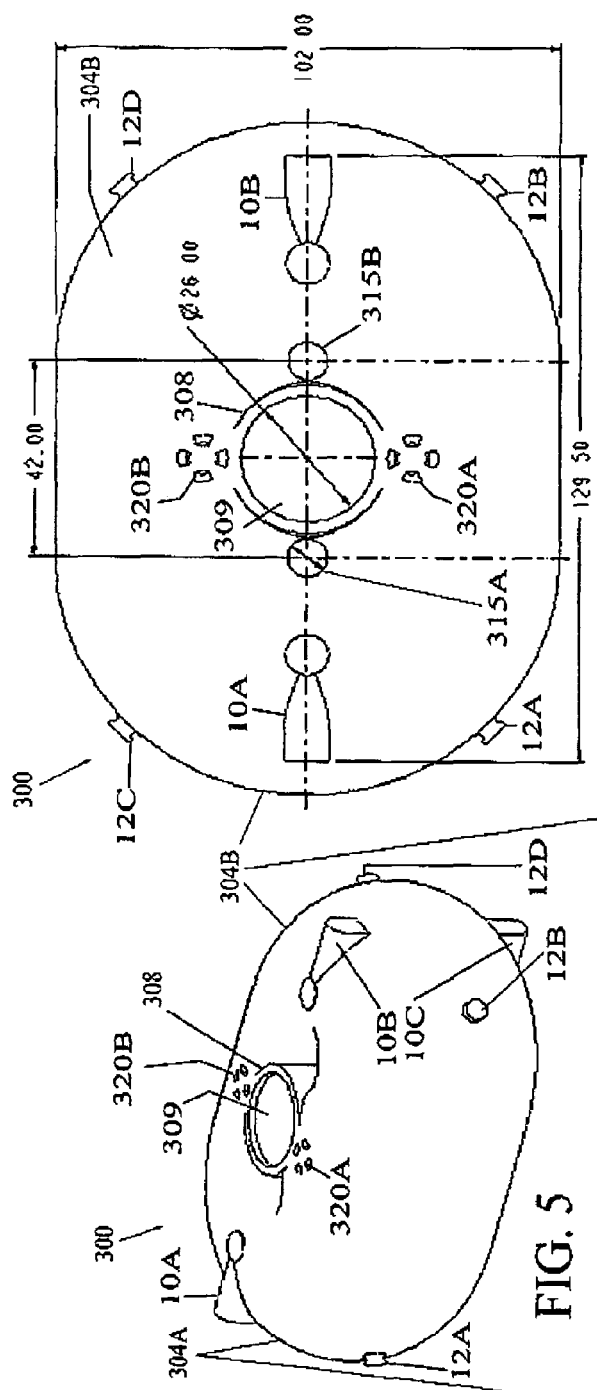
FIG. 6
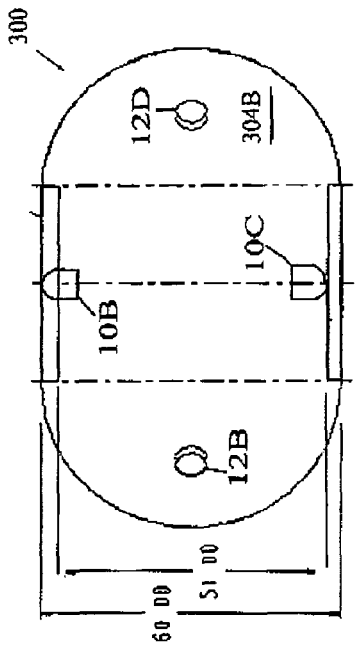
FIG. 5
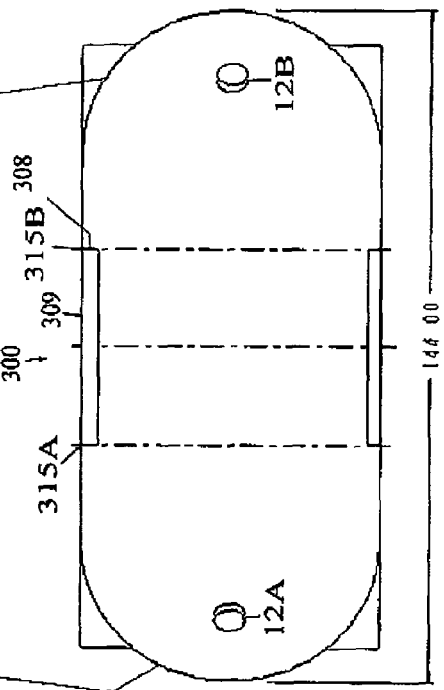
FIG. 7
FIG. 8

TOROIDAL TANK

CROSS-REFERENCE TO RELATED APPLICATIONS

The present application derives priority from U.S. Provisional Application No. 60/625,995, filed 8 Nov. 2004.

BACKGROUND OF THE INVENTION

1. Field of the Invention

The present invention relates to underground tanks and, more particularly, to an improved underground tank design incorporating a toroidal shape for improved strength.

2. Description of the Background

Underground storage tanks have long been used for storing various fluids, including gasoline, water, or other chemicals. Such tanks must withstand pressure from the surrounding soil, elevated water tables, and the tank contents. In addition, they must be resistant to the corrosive effects of their contents and the surrounding soil. Thus, the structure of underground storage tanks must be robust and liquid tight, or leakage will occur.

Underground water storage tanks and septic tanks were traditionally constructed of masonry materials such as stone and brick. Since masonry construction is very labor intensive and difficult to make liquid-tight, it was largely replaced by site-cast or pre-cast concrete construction. Underground fuel storage tanks were traditionally constructed of steel.

Both concrete and steel are susceptible to corrosion, especially where tanks are buried in wet soils. They are also very heavy, complicating transport and installation. These problems spurred the development of corrosion-resistant tanks constructed of fiberglass reinforced plastic (FRP), polypropylene (PP), and polyethylene (PE).

Xerxes Corporation, a leader in fiberglass reinforced plastics, and its predecessor, introduced FRP underground storage tanks in the 1970's, along with Owens Corning Fiberglass. These tanks have been proven reliable and are widely used for fuel storage and other applications where strength is primary. However, FRP tanks are expensive and are prone to damage in shipping and installation. In addition, inlet, outlet, and access connections to FRP tanks can be problematic and expensive.

In comparison with FRP tanks, rotationally molded PE tanks are inexpensive to produce and are resistant to damage in transport and installation because they flex under impact. A variety of reliable connections can be formed into the rotational molds at minimal additional cost. For these reasons, PE tanks are widely used for small-scale water storage and on-site waste treatment applications.

Since PE is a relatively weak material that creeps under constant pressure, many designs have been proposed to increase the strength of underground PE tanks. Spherical shapes are very strong but do not pack well for transport and can be difficult to handle. In addition, to achieve significant capacity, spherical tanks must have a large diameter, which necessitates a deep excavation. For these reasons, spherical tanks are typically limited to 500 gallon capacity.

Flattened spheres and horizontal cylinders of PE offer larger capacities without the need for deep excavation, but at a significant loss of strength. To compensate, such shapes are typically strengthened with reinforcing ribs. For example, U.S. Pat. No. 4,359,167 to Fouss et al. shows a ribbed flattened spherical storage tank having a plurality of integrally molded reinforcing ribs. Ribs greatly strengthen tank walls against the crushing forces of hydrostatic pressure, but add considerable material cost. Ribs also trap fluids and air, reducing the effective volume of the tank. Ribs also create possibility of accordian-like folding under stress.

Other efforts have been directed toward internally reinforcing tanks to increase strength. For example, U.S. Patent Application Publication U.S. 2004/0011786A1 by Wade shows a molded cylindrical tank with pass-through internal support columns to prevent crushing. However, tanks with multiple internal columns have reduced volume and can be difficult to mold.

Still other efforts have utilized toroidal or "doughnut" shapes that exhibit sphere-like strength characteristics. For example, U.S. Pat. No. 4,615,452 to Lederer et al. discloses compound toroidal tanks with at least two stacked concentric toroidal cells sharing a common axis, with a partition and references prior art showing an unpartitioned torus. These conventional toroidal configurations offer increased strength but suffer from low storage capacity and high material cost in relation to their overall dimensions.

The present inventor recognized great potential of the toroidal shape in the context of an underground storage tank, especially a rotationally-molded PE tank, and has now developed an improved underground storage tank configuration and a number of tank embodiments incorporating the base configuration.

SUMMARY OF THE INVENTION

It is, therefore, an object of the present invention to provide an improved toroidal tank for underground fluid storage that achieves superior strength by virtue of one or more relatively small center holes in relation to the overall tank measurements so that volume is maximized and the center holes behave like internal support columns.

It is another object to provide an improved toroidal tank for underground fluid storage that achieves superior strength with few or no reinforcing ribs so that nearly all internal capacity is useable space.

It is another object to provide an improved toroidal tank for underground fluid storage that can be buried below the frost line (at least 4 ft deep) and can be used in high water tables, as compared to prior art tanks, which are buried at a maximum of 2 ft to 3 ft deep and are not suitable for high water tables.

It is another object to provide an improved toroidal tank for underground fluid storage in excess of 2400 gallons nominal capacity as compared with prior art tanks that are limited to 2000 gallons or less nominal capacity by the strength of their shapes.

It is still another object to provide an improved toroidal tank for underground fluid storage that is economical to produce, the shape permitting a low ratio of plastic per gallon of fluid stored.

It is still another object to provide an improved toroidal tank for underground fluid storage of particular sizes and shapes that are optimized for shipping on US flatbed trailers.

It is still another object to provide an improved toroidal tank for underground fluid storage having an improved system for ballasting with concrete in soils with high water tables.

It is another object to provide an improved modular tank design in which multiple tanks may be easily joined on-site to provide the effective capacity of larger tanks.

According to the present invention, the above-described and other objects are accomplished by providing improved storage tanks having a three-dimensional toroidal configuration. The preferred embodiment is a double-torus (2-torus) tank having a first walled section formed in a toroidal configuration and an identical second walled section formed in a toroidal configuration. The first and second toroidal walled sections are integrally merged end-to-end in a double-torus configuration. An access port is formed with cylindrical walls traversing said tank between the first and second toroidal walled sections orthogonally and centrally at their merger. A single reinforcing rib circumscribes the merger of the two toroidal walled sections and intersects the walls of the access port. A plurality of tangential inlet and outlet ports are provided into and from said tank.

The preferred double-torus configuration may be expanded to a triple-torus, quadruple-torus, or a general n-torus configuration by integrally merging additional toroidal walled sections. These configurations can also include additional access ports as well as additional reinforcing ribs at the merger of each pair of toroidal walled sections.

Moreover, a single-torus configuration is possible in which a toroidal walled section is formed in a full torus with a center hole, and at least one access port formed with cylindrical walls traverses the storage tank.

In any of the disclosed configurations the improved toroidal tank design for underground fluid storage achieves superior strength by virtue of the self-reinforcing multi-dimensional curvature of the tank walls, and by virtue of relatively small center holes (in relation to the overall tank measurements) that behave like internal support columns. Moreover, the small size of the center holes allows volume to be maximized.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 5 is a perspective drawing of a double-torus tank 300 for underground fluid storage according to an alternate embodiment of the present invention.

FIG. 6 is a top view of the double-torus tank 300 of FIG. 5 with dimensions.

FIG. 7 is a side cross-section of the double-torus tank 300 of FIGS. 5 and 6.

FIG. 8 is an end cross-section of the double-torus tank 300 of FIGS. 5-7.

DETAILED DESCRIPTION OF THE PREFERRED EMBODIMENTS

The present invention is an underground liquid storage tank formed with side-walls in a generally toroidal configuration. In topology, the simplest "torus" is a doughnut-shaped object created by revolving a geometric circle around a coplanar axis external to the circle. However, the term "torus" can be used to refer to any object created by revolving an ellipse or any other closed planar curve around a coplanar axis external to the curve.

The present invention may adapt a single torus configuration or, alternatively, multiple torus-configurations defined by the merger of two or more single torus configurations. In each configuration, one or more cylindrical access ports are provided. In the case of the single torus configuration, the cylindrical walls of the access port intersect the torus orthogonally. The radius of the access port conforms to that of the center hole and the cylindrical walls of the access port merge with the walls of the torus as they curve into and out from the center hole. In the preferred embodiment of the multiple torus-configurations, the access port is positioned at the intersection and the cylindrical walls of the access port merge into the intersection as will be described. However, the access port in the multiple-torus configurations may be positioned at one end of the tank in the same location as in the single-torus configuration, or there could be access ports at both ends.

Figure 1:
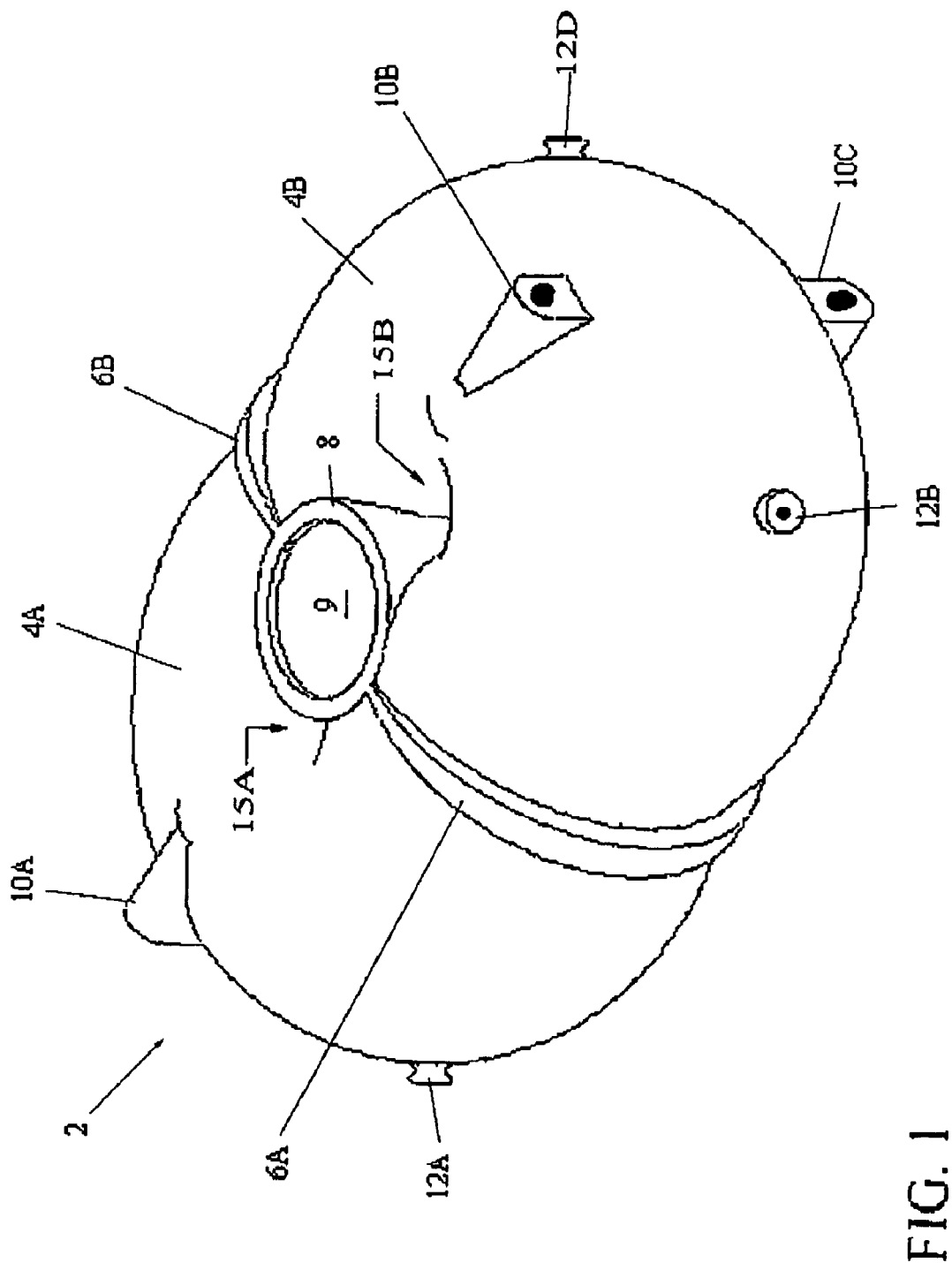
FIG. 1 is a perspective drawing of a double-torus tank 2 for underground fluid storage according to one embodiment of the present invention.

FIG. 1 is a perspective drawing of a double-torus tank 2 for underground fluid storage according to a preferred embodiment of the present invention. Tank 2 generally comprises a first semi-torus section 4A merged with a second co-planar semi-torus section 4B along a centerplane. Both semi-torus sections 4A & 4B are of uniform size and comprise at least 180 degree arcs. The inherent strength of the multi-dimensional curved toroidal walls along these arcs eliminates the need for reinforcing ribs as in the prior art. Such ribs added strength against inward point forces, but actually decreased strength laterally as the ribs were prone to accordian-like movement. More importantly, reinforcing ribs nearly doubled the surface area and the materials costs of such tanks. The double-torus tank of FIG. 1 needs just a single reinforcing rib along the centerplane merger. An access port 9 is defined by cylindrical walls 8 formed centrally at the merger and extending orthogonally into the double-torus. The reinforcing rib merges into the access port walls 8 and are thereby subdivided into a first rib 6A and a second rib 6B, said ribs adding reinforcement at the limited joinder area of the walls 4A & 4B, the only area where the self-reinforcing benefit of three-dimensional curvature is lacking. This is the only area where reinforcement is needed against point pressure, and the remainder of walls 4A & 4B are substantially smooth. There is no need for internal struts or reinforcement. The radius of the access port walls 8 is preferably approximately four times that of the geometric center hole of each torus section 4A & 4B. A plurality of inlet and outlet ports 10A-D are provided at opposing ends of walls 4A & 4B. The pair of inlet ports 10A & 10B lead horizontally into the top of tank 2 at opposing ends, each being defined by a raised neck having a semi-oval cross-section tapering laterally into the upper extent of curved walls 4A & 4B as shown. Thus, the inlet ports 10A & 10B enter the tank 2 flush with the upper surface of the walls 4A & 4B. Similarly, a pair of outlet ports 10C & 10D lead horizontally into the bottom of tank 2 at opposing ends, each being defined by a raised neck having a semi-oval cross-section tapering laterally into the upper extent of curved walls 4A & 4B as shown. Thus, the outlet ports 10A & 10B enter the tank 2 flush with the lower surface of the walls 4A & 4B. Since all ports 10A-10D enter the tank 2 flush with the upper or lower surfaces of the walls 4A & 4B, there is no area within tank 2 for its contents, or the air above its contents, to become trapped, and substantially all of the volume of the tank 2 becomes usable. This feature also provides a distinct advantage over reinforcing ribs that do tend to trap liquid. In addition to the ports 10A-D, a series of protrusions 12A-12D are evenly-spaced around the tank 2 at its mid-section to facilitate lifting or securing the tank with straps or rope.

The smooth lines of tank 2 are especially well-suited for rotational molding, and the entirety of the tank 2 can be rotationally-molded in a conventional manner with HDPE plastic using a simple two-part mold. Typically, a cylindrical manway will be bolted to the top flange surrounding access port 9. The foregoing design capitalizes on the self-reinforcing structure of the toroidal shape, especially in the context of an underground storage tank, providing increased strength and maximum storage volume per dollar cost of the tank.

The center holes 15A and 15B can also be used for anchoring the tank 2 to prevent flotation in soils with high water tables. A concrete platform is constructed with reinforcing bars protruding vertically at the location of each center hole of the tank. The tank is lowered over the reinforcing bars and concrete is poured to fill each hole, encasing the reinforcing bars.

Figure 2:
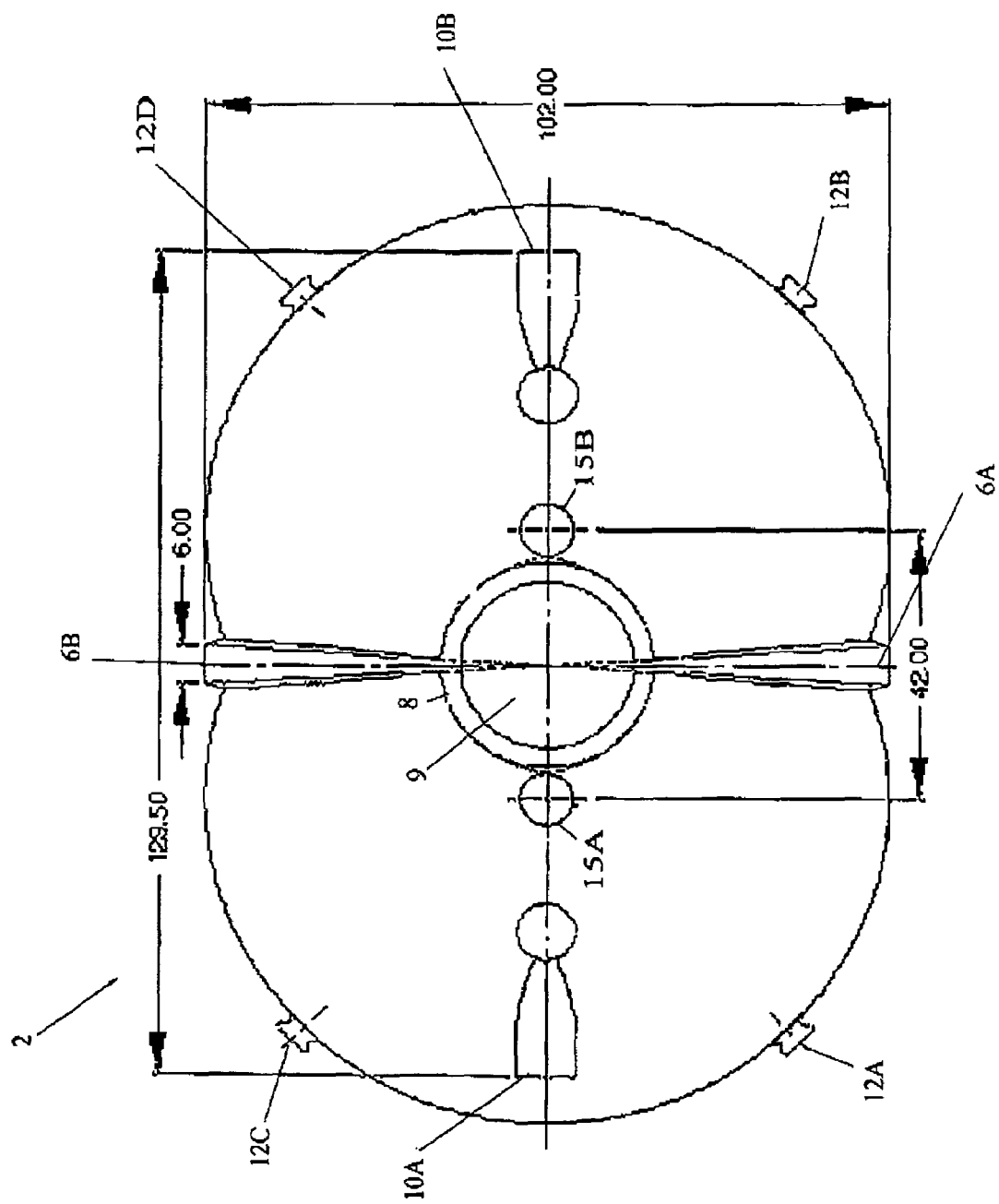
FIG. 2 is a top view of the double-torus tank 2 of FIG. 1 with dimensions.
Figure 3:
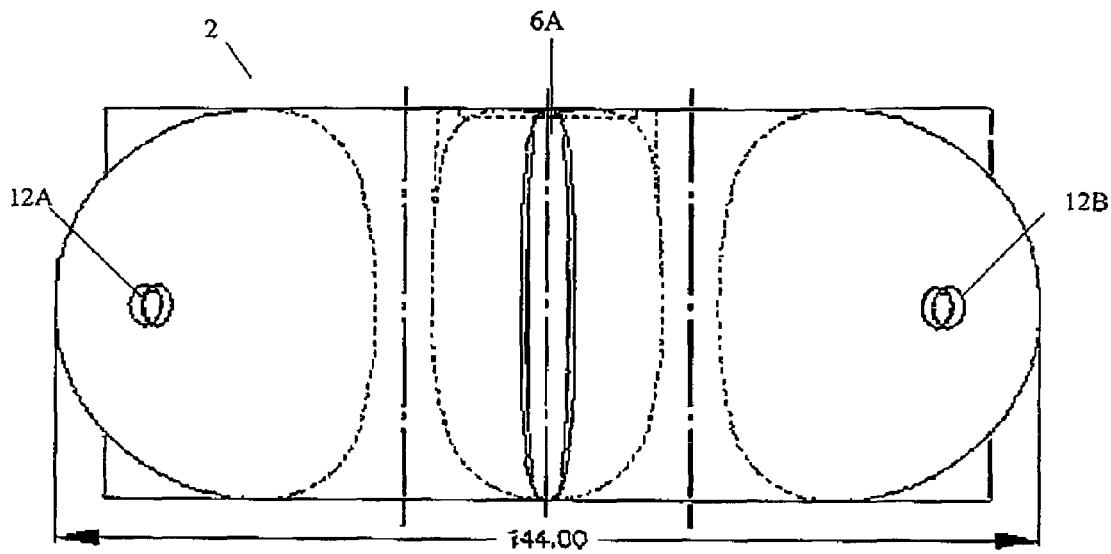
FIG. 3 is a side cross-section of the double-torus tank 2 of FIGS. 1 and 2.
Figure 4:
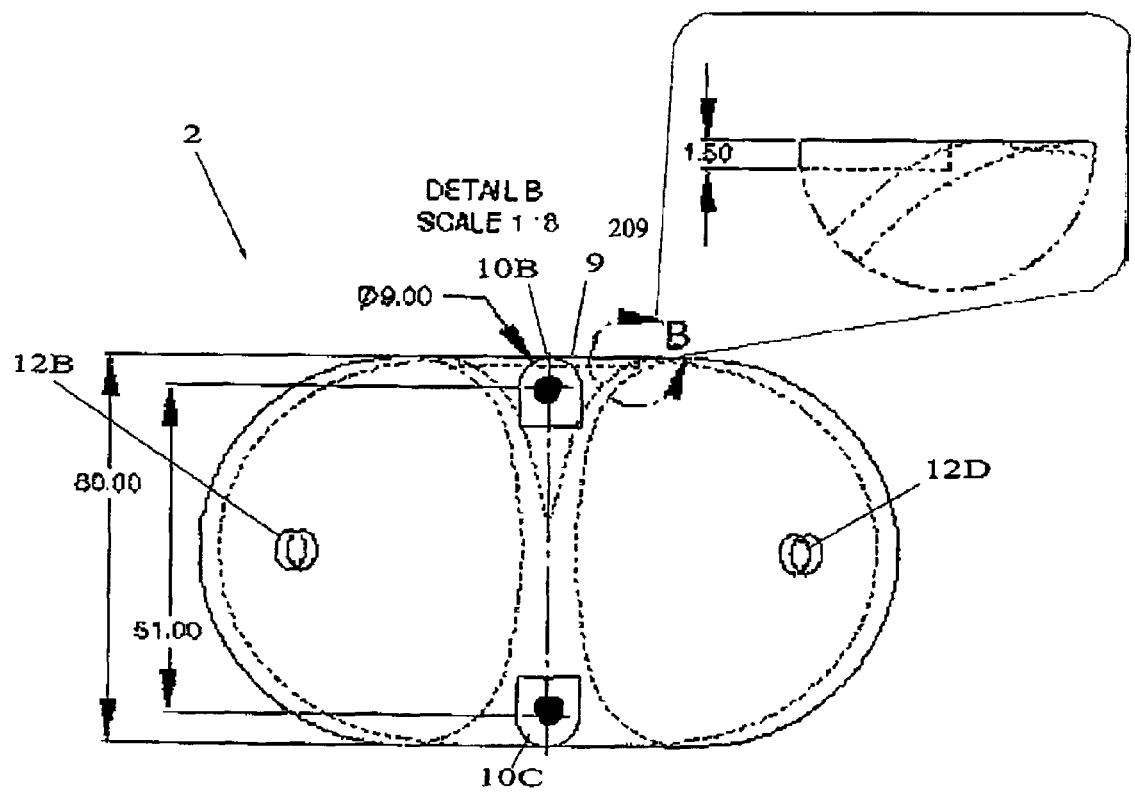
FIG. 4 is an end view of the double-torus tank 2 of FIGS. 1-3.

FIG. 2 is a top view of the double-torus tank 2, FIG. 3 is a side view, and FIG. 4 is an end view, all with exemplary dimensions. Each torus section 4A & 4B is approximately 72" long to the centerplane merger. The tank 2 is approximately 102" wide. The access port 9 is defined by a 26" inner diameter and 32" outer diameter with respect to the cylindrical walls 8. The first rib 6A and second rib 6B are each formed with a 6" flat at the outer periphery tapering inward to the access port 9, where the flat of ribs 6A & 6B is approximately 1". The distance between the inlet ports 10A & 10B is approximately 129.5", and the distance between the outlet ports 10C & 10D (not shown) is equal. In addition to the ports 10A-D, four protrusions 12A-12D are evenly-spaced around the tank 2 as shown at its mid-section to facilitate lifting or securing the tank with straps or rope.

The basic configuration of the above-described tank 2 may be readily adapted to any multiple torus-configurations. For example, a triple torus tank will comprise three torus sections merged end-to-end as above with two access ports, one at each area of merger. A quadruple torus tank will comprise four torus sections arranged in two pairs, each pair being merged end-to-end as above, and the two pair being merged sidelong to provide four radially-spaced torus sections with four access ports, one at each area of merger. It should be apparent that any multiple torus-configuration is possible, including six, eight, ten or more torus sections. In each such case, the torus configuration is a modular design that utilizes identical torus sections.

FIG. 5 is a perspective view of a double-torus tank 300 for underground fluid storage according to an alternate embodiment of the present invention. Tank 300 generally comprises a first semi-torus section 304A merged with a second coplanar semi-torus section 304B along a centerplane. Both semi-torus sections 304A & 304B are of uniform size and comprise a 180 degree arc. Again, the inherent strength of the multi-dimensional curved toroidal walls along these arcs eliminates the need for many reinforcing ribs as in the prior art. However, this design presents areas on either side of the access port that are more prone to collapse, and for this reason two vertical support pipes are provided internally. These support pipes are secured between dimpled standoffs top and bottom visible as depressions 320A & 320B. An access port 309 with access port walls 308 is formed, and the radius of the access port walls 308 is again approximately four times that of the geometric center hole of each torus section 304A & 304B. Similarly, the same array of inlet and outlet ports 10A-D, and lifting/securing protrusions 12A-12D may be provided as shown. If desired, the center holes 315A and 315B can be used for anchoring the tank to prevent flotation in soils with high water tables using the same method as Tank 2.

FIGS. 6-8 are a top view, side view and end view, respectively, of the double-torus tank 300 with exemplary dimensions. Each torus section 304A & 304B is approximately 72" long to the centerplane merger. The tank 300 is approximately 102" wide. The access port 309 is defined by a 26" inner diameter and 32" outer diameter with respect to the cylindrical walls 308. Internal support pipes serve as structural struts and connect to the dimpled standoffs 320A and 320B. The dimensions of inlet ports 10A-D and protrusions 12A-12D are substantially the same as in FIG. 1.

Figure 9:
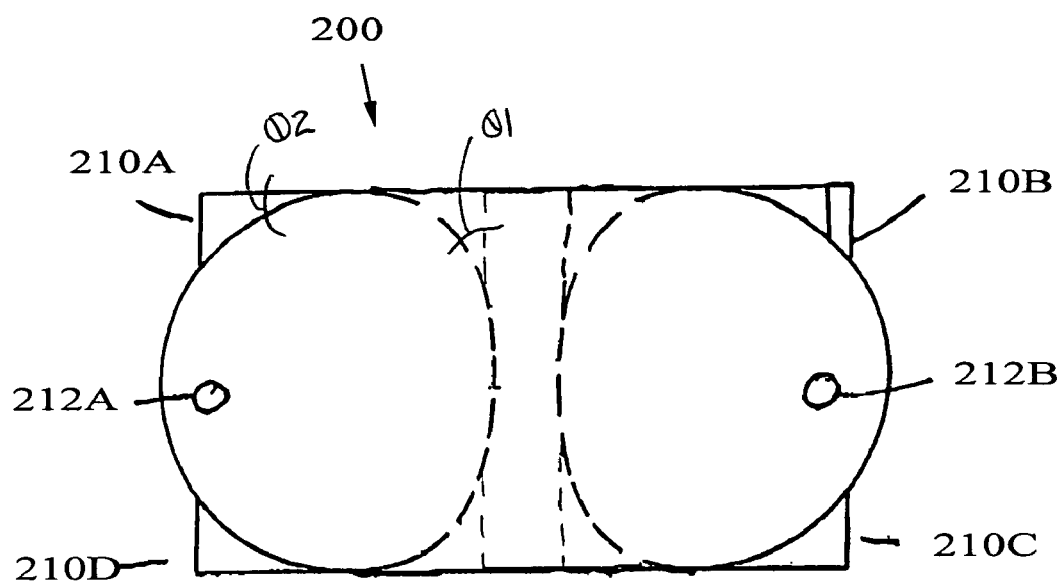
FIG. 9 is a side cross section of a single-torus tank 200 according to an alternate embodiment of the present invention.
Figure 10:
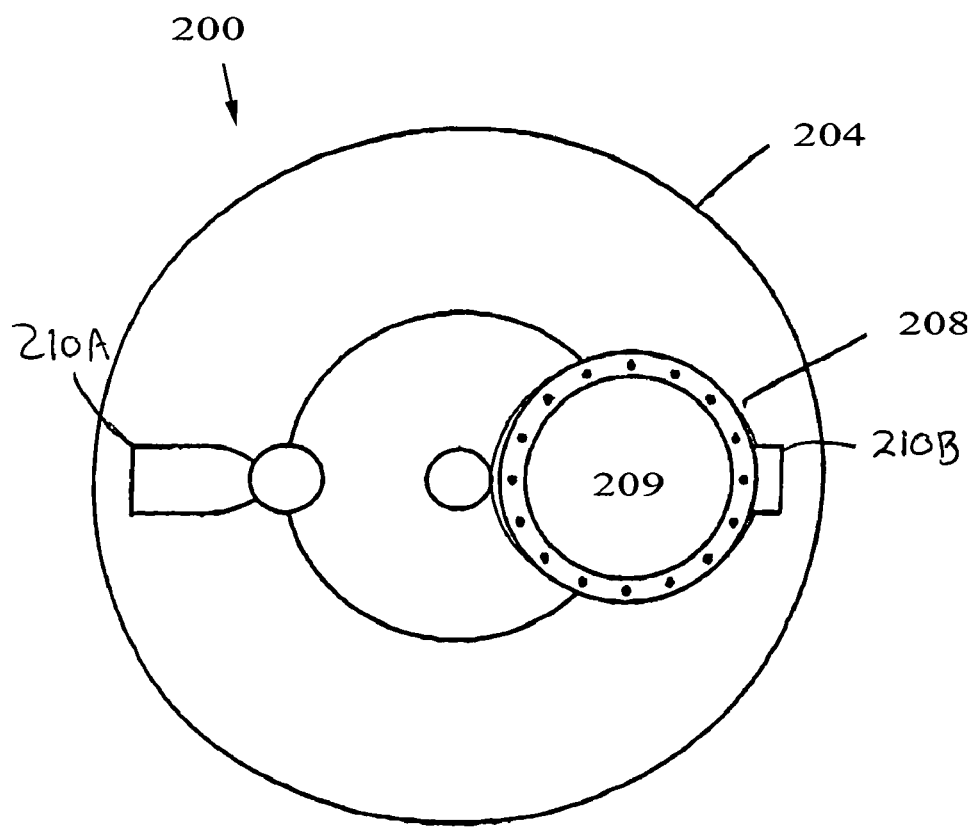
FIG. 10 is a top view of the single-torus tank 200 of FIG. 9.

FIG. 9 is a side cross-section and FIG. 10 is a top view of a single-torus tank 200 according to an alternate embodiment of the present invention. Tank 200 generally comprises a single full-torus walled section 204 comprising a 360 degree arc. Here the inherent strength of the multi-dimensional curved toroidal walls along the entire arc eliminates the need for any reinforcing ribs or internal struts, including the ribs 6A & 6B as in FIG. 1. An access port 209 is defined by cylindrical walls 208 formed centrally at the center of the torus and extending orthogonally into the torus. The walls of the access port 209 bound a center hole running centrally through the toroidal walled section 204 that intersects the toroidal walled section 204 orthogonally, and the toroidal walls of the walled section 204 merge at an acute angle $\theta 1$ with the cylindrical walls of the access port 209 as the walls of said toroidal walled section curve into and out from the access port 209 center hole. As with the double-torus tank, a plurality of inlet and outlet ports 210A-D are provided at opposing ends of the walls 204. The pair of inlet ports 210A & 210B lead horizontally into the top of tank 200 at opposing ends, each being defined by a raised neck having a semi-oval cross-section tapering laterally into the upper extent of curved walls 204 as shown. The raised necks of the inlet ports 210A & 210B merge at an acute angle $\theta 2$ into the toroidal walls of the walled section 204. Thus, the inlet ports 210A & 210B enter the tank 200 flush with the upper surface of the walls 204. Similarly, a pair of outlet ports 210C & 210D lead horizontally into the bottom of tank 200 at opposing ends, each being defined by a similar raised neck and entering the tank 2 flush with the surface of the walls 204 in a like manner. Substantially all of the volume of the tank 200 is likewise usable. In addition to the ports 210A-D, a series of protrusions 212A-212D are evenly-spaced around the tank 200 at mid-height to facilitate lifting or securing the tank with straps or rope.

In any of the foregoing configurations the improved toroidal tank design for underground fluid storage achieves superior strength and maximum volume. The self-reinforcing curvature of the tank walls achieves superior strength, which is further bolstered by the center hole(s) that behave like internal support columns. Thus, few or no additional reinforcing ribs or internal struts are necessary. Moreover, the small size of the center holes (relative to overall volume) allows volume to be maximized. Consequently, any of the aforementioned tanks can be buried below the frost line, can be used in high water tables, and will have a greater capacity per unit cost since nearly all internal capacity is useable space (as compared to tanks where useable capacity is significantly less due to ribs at the top and bottom). Moreover, the dimension stated in FIGS. 2-4 and 6-8 allow the tanks to fit neatly for shipping on standard US flatbed trailers. The central holes also allow more reliable anchoring of the tanks on concrete ballast platforms.

Having now fully set forth the preferred embodiments and certain modifications of the concept underlying the present invention, various other embodiments of the lateral-mount lower tank as well as certain variations and modifications thereto may obviously occur to those skilled in the art upon becoming familiar with said underlying concept. For instance, the tank need not be polyethylene. Alternately, it may be formed of other moldable plastics. It is to be understood, therefore, that the invention may be practiced otherwise than as specifically set forth herein.

I claim:

1. A storage tank, comprising:
   a three-dimensional double torus surface formed from two three-dimensional single-torus surfaces of substantially uniform size and each defined about an axis, said two three-dimensional single-torus surfaces being co-planar and with parallel axes, and integrally merged so as to retain two distinct partial toroidal shapes each having a distinct hole;
   an access port formed from a partial intersection of a cylindrical surface with said double torus surface, a center axis of said cylindrical surface being parallel to and spaced between said parallel axes of the two three-dimensional single-torus surfaces.

2. The storage tank of claim 1, further comprising a reinforcing rib circumscribing the merger of said two three-dimensional single-torus surfaces.

3. A storage tank, comprising:
   a three-dimensional multiple torus surface formed from a plurality of three-dimensional single-torus surfaces each defined about an axis, said plurality of three-dimensional single-torus surfaces being co-planar and with parallel axes, and integrally merged so as to retain multiple distinct partial toroidal shapes each having a distinct hole; and
   at least one an access port formed from a partial intersection of a cylindrical surface with said multiple torus surface, a center axis of said cylindrical surface being parallel to and spaced between said parallel axes of the plurality of three-dimensional single-torus surfaces.

4. The storage tank of claim 3, further comprising at least one reinforcing rib circumscribing the merger of at least one pair of said of three-dimensional single-torus surfaces.

5. The storage tank of claim 1, further comprising two support columns connecting a top of the tank and a bottom of the tank at the merger of the two three-dimensional single-torus surfaces.

6. The storage tank of claim 4, further comprising a plurality of reinforcing ribs each circumscribing the merger of at least one pair of said of three-dimensional single-torus surfaces.

7. The storage tank of claim 1, further comprising at least one inlet port and at least one outlet port provided at opposing ends of said storage tank.

8. The storage tank of claim 3, further comprising two support columns connecting a top of the tank and a. bottom of the tank at the merger of at least one pair of three-dimensional single-torus surfaces.

9. The storage tank of claim 3, further comprising at least one inlet port and at least one outlet port provided at opposing ends of said storage tank.

* * * * *